United States Patent
Weber et al.

(10) Patent No.: US 10,185,302 B2
(45) Date of Patent: Jan. 22, 2019

(54) METHOD FOR OPERATING A GEAR CUTTING MACHINE

(71) Applicant: Klingelnberg AG, Zürich (CH)

(72) Inventors: Jürgen Weber, Hückeswagen (DE); Karl-Martin Ribbeck, Remscheid (DE); Herbert Blasberg, Hückeswagen (DE)

(73) Assignee: KLINGELNBERG AG (CH)

( * ) Notice: Subject to any disclaimer, the term of this patent is extended or adjusted under 35 U.S.C. 154(b) by 0 days.

(21) Appl. No.: 15/560,621

(22) PCT Filed: Mar. 23, 2016

(86) PCT No.: PCT/EP2016/056310
§ 371 (c)(1),
(2) Date: Sep. 22, 2017

(87) PCT Pub. No.: WO2016/150986
PCT Pub. Date: Sep. 29, 2016

(65) Prior Publication Data
US 2018/0052440 A1 Feb. 22, 2018

(30) Foreign Application Priority Data
Mar. 23, 2015 (DE) ........................ 10 2015 104 289

(51) Int. Cl.
G05B 19/404 (2006.01)
B23Q 15/22 (2006.01)
B23F 23/12 (2006.01)

(52) U.S. Cl.
CPC ........... *G05B 19/404* (2013.01); *B23Q 15/22* (2013.01); *B23F 23/1218* (2013.01);
(Continued)

(58) Field of Classification Search
CPC . Y10T 409/102226; Y10T 409/101749; Y10T 409/10954; B23F 23/1218; B23Q 15/22; G05B 19/404; G05B 2219/49207
See application file for complete search history.

(56) References Cited

U.S. PATENT DOCUMENTS 4,533,858 A * 8/1985 Tlaker ................... B23Q 15/18
                                                         318/471
4,714,387 A    12/1987 Seishichi
(Continued)

FOREIGN PATENT DOCUMENTS

DE    2833923  A1    3/1979
EP    2394770  A1    12/2011
WO    2007090871 A1    8/2007

OTHER PUBLICATIONS

International Search Report for Application No. PCT/EP2016/056310, dated Jun. 24, 2016, 2 pages.
(Continued)

*Primary Examiner* — Daniel Howell
*Assistant Examiner* — Yasir Diab
(74) *Attorney, Agent, or Firm* — McCarter & English, LLP

(57) ABSTRACT

A method for operating a gear cutting machine comprising the following steps:
  machining a first workpiece (1) in the machine, wherein the first workpiece (1) heats up due to the machining,
  determining at least one characteristic workpiece variable in the first workpiece (1) in the heated state, wherein a measuring device of the machine is used for the determination,
  determining a compensation on the basis of the at least one characteristic workpiece variable of the first workpiece (1) and at least one characteristic workpiece variable of a reference workpiece, wherein
  (Continued)

the characteristic workpiece variable of the reference workpiece is determined in the machine after a steady-state temperature has been reached, at least one compensation value is determined in the course of determining the compensation, adjusting of the machine setting by taking into account the at least one compensation value, and machining a further workpiece (2) in the machine.

7 Claims, 3 Drawing Sheets

(52) U.S. Cl.
CPC .............. *G05B 2219/49207* (2013.01); *G05B 2219/50282* (2013.01); *G05B 2219/50307* (2013.01); *Y10T 409/102226* (2015.01)

(56) References Cited

U.S. PATENT DOCUMENTS

| | | | | |
|---|---|---|---|---|
| 5,421,683 | A | * | 6/1995 | Keehn .................. G05B 19/404 408/56 |
| 5,904,457 | A | * | 5/1999 | Suwijn .................... B23F 23/12 409/1 |
| 2006/0218811 | A1 | * | 10/2006 | Sato ...................... G05B 19/404 33/702 |
| 2010/0023297 | A1 | * | 1/2010 | Kikuchi .................... B23F 5/04 702/150 |
| 2013/0289917 | A1 | * | 10/2013 | Chang .................. G01B 5/0014 702/94 |

OTHER PUBLICATIONS

International Preliminary Report on Patentability for Application No. PCT/EP2016/056310, dated Oct. 5, 2017, 8 pages.

* cited by examiner $T_W = T1$

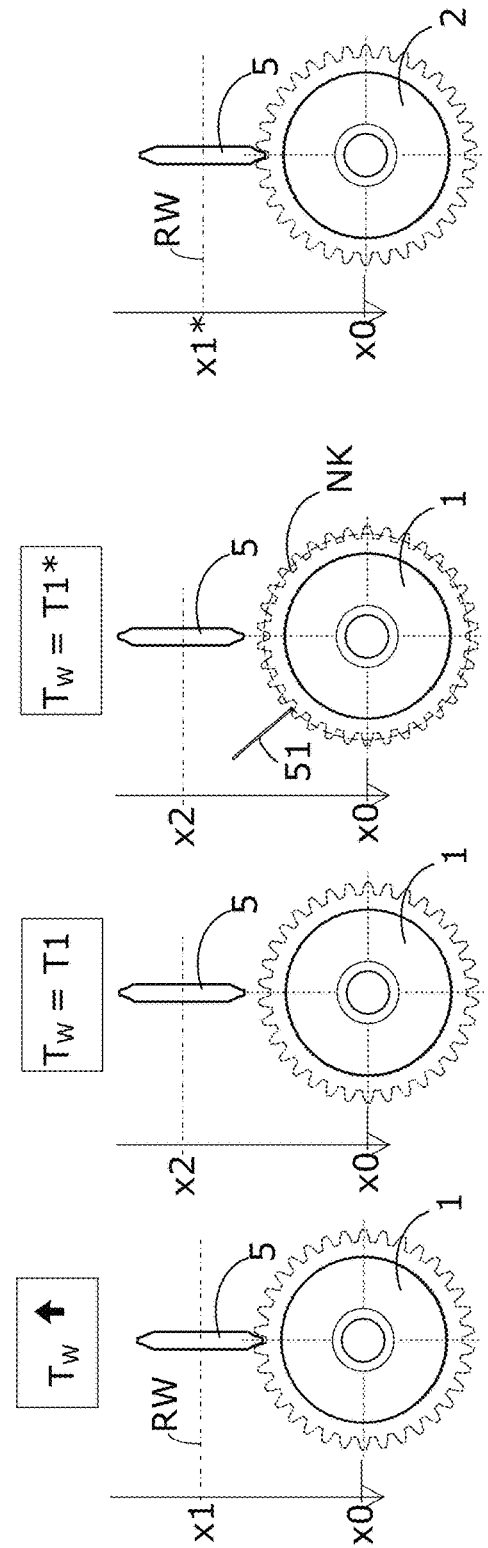

METHOD FOR OPERATING A GEAR CUTTING MACHINE

CROSS-REFERENCE TO RELATED APPLICATIONS

This application is the U.S. National Phase of International Patent Application No. PCT/EP2016/056310, entitled "Method for Operating a Gear Cutting Machine", filed on Mar. 23, 2016, which claims priority from German Patent Application No. 10 2015 104 289.4 filed on Mar. 23, 2015, the disclosures of which are hereby incorporated in their entirety.

FIELD OF THE INVENTION

The subject matter of the invention is a method for operating a gear cutting machine. In particular, it relates to a method for temperature compensation in a gear cutting machine.

BACKGROUND OF THE INVENTION

There are various methods for the chip removing cutting of gearwheels. The correspondingly designed machines are referred to here as gear cutting machines.

It is known that the temperature of the gear cutting machine increases with time because of various procedures in the machine. In continuous operation of a machine, it reaches a so-called steady-state temperature. The steady-state temperature results in a thermally stationary state. In this state, the temperature of the machine has thermally stabilized. A stabilization of the heat flows thus occurs over time, which results in a stationary state.

It is also known that inaccuracies can occur in a machining process because of thermal expansion processes. This is because, inter alia, the greatly varying elements of the machine experience a thermal expansion with increasing temperature. A corresponding thermal contraction occurs upon cooling. On the one hand, the dimensions of the individual machine elements change with increasing temperature of the machine. Since numerous elements are connected to one another in a machine, tensions (and warping) can occur because of different coefficients of expansion, which are displayed in nonlinear expansion behavior, which cannot be computed accurately, of the machine.

The thermal behavior of a machine is influenced by the effect of heat sources and heatsinks. A differentiation is made in the case of thermal effects between internal and external influences. For example, the heat emission of motors is considered to be an internal influence. A further internal influence results from the cutting interaction of a tool with a workpiece, because mechanical energy is converted into heat here. External influences are, for example, the ambient temperature in a machine shop.

It is immediately apparent that the length, for example, of a cantilever, which is connected on one side to a machine stand, for example, increases with increasing temperature. Such a cantilever experiences a linear expansion in the longitudinal direction. In the case of complicated machine elements and more complex geometries, for example, a spindle bearing, the relationships are significantly more complex.

The operating accuracy of chip producing machines is substantially dependent on how accurately the movements in the three-dimensional space between the tool and the workpiece can be executed. Finally, relative deviations during the movement of the tool relative to the workpiece result due to all temperature-related effects. These relative deviations result in deviations on the workpiece.

Productivity and accuracy are important aspects of machine tools. The thermal accuracy of machines is gaining more and more significance in consideration of strongly increased demands in the matter of manufacturing precision. Particularly in the case of small manufacturing batches and therefore changing machine tasks, a thermally stable state cannot be achieved. In the case of machines which are in continuous use, the accuracy gains significance above all after an interruption. Moreover, one wishes to reduce the discards which typically occur after an interruption until the machine has again reached the steady-state temperature to some extent. Thus, in addition to accuracy, this also relates to questions of cost-effectiveness.

One common approach is to keep machine and surroundings at a consistent temperature level. The deformation of the machine may be avoided by way of a uniform temperature. For this purpose, on the one hand the machine shop has to be climate-controlled and, on the other hand, the machine has to be continuously operated. The expenditure in costs and energy is correspondingly high.

Another approach is monitoring the deformation of the machine by way of integrated sensors. On the basis of a mathematical model, in which the data of the sensors are further processed, the foundation can be formed for an approximate prediction of the flaws, which would arise on the workpiece. If these flaws are known, the machine can thus adapt accordingly and compensate for the flaws. The expenditure is also high here. Moreover, there have been no technological approaches up to this point which meet the high accuracy requirements.

In consideration of the above statements, the following object results. It relates to finding an approach which enables compensating for temperature-related changes of a machine. Above all, this relates to improving the accuracy of a machining process in a machine immediately after an interruption, to thus reduce the discards. A pause which is preferably longer than 15 minutes is referred to as an interruption.

SUMMARY OF THE INVENTION

In one embodiment, the method for operating a gear cutting machine comprises the steps of machining a first workpiece in the gear cutting machine wherein the temperature of the first workpiece increases as a result of the machining, determining at least one characteristic workpiece variable on the first workpiece at the increased temperature wherein a measuring device on the gear cutting machine is used for determining the at least one characteristic workpiece variable, determining a compensation value by comparing the at least one characteristic workpiece variable of the first workpiece and at least one characteristic workpiece variable of a reference workpiece wherein the characteristic workpiece variable of the reference workpiece was determined in the gear cutting machine after reaching a steady-state temperature, adjusting at least one gear cutting machine setting based upon the at least one compensation value, and machining a workpiece in the gear cutting machine after adjusting the at least one gear cutting machine setting.

In one embodiment, the reference workpiece is a workpiece which was machined while the gear cutting machine was operating at a steady state temperature. In another embodiment the machining of the first workpiece and the determination of the at least one characteristic workpiece variable are performed when the gear cutting machine is operating at less than a steady state temperature. In another embodiment, the steady-state temperature is the temperature of the gear cutting machine after a period of continuous operation. In one embodiment, the determination of the characteristic workpiece variables of the first workpiece and the reference workpiece is performed by a measuring probe of a measuring device, wherein the measuring device is part of the gear cutting machine and wherein the corresponding workpiece is not re-chucked during the determination of the characteristic workpiece variables. In another embodiment, the gear cutting machine is operating at less than a steady state temperature due to at least one of stoppage of the gear cutting machine because of a shutdown, stoppage of the gear cutting machine because of maintenance or repair, or stoppage of the gear cutting machine because of refitting. In one embodiment, the stoppage of the gear cutting machine is for a period of at least 15 minutes. In another embodiment, the stoppage of the gear cutting machine results in a reduction of the temperature measured in the gear cutting machine of more than 10% of the steady-state temperature in the gear cutting machine following a period of continuous operation. In one embodiment, the method for operating the gear cutting machine further comprises the steps of, prior to machining of the first workpiece, machining a test workpiece in the gear cutting machine, wherein the test workpiece heats up during the machining, and allowing the test workpiece to cool to ambient temperature and determining one or more characteristic variables of test workpiece in the cooled state, to determine whether the one or more charateristic variables correspond to target values.

DRAWINGS

Further details and advantages of the invention will be described hereafter on the basis of exemplary embodiments and with reference to the drawings.

FIG. 3A shows a top view of a tool and a workpiece of an exemplary gear cutting machine having measuring device, wherein the workpiece is machined using the tool at the moment shown;

FIG. 3B shows a top view of the tool in the workpiece of FIG. 3A, wherein the tool is moved away relative to the workpiece at the moment shown;

FIG. 3C shows a top view of the tool and the workpiece of FIG. 3A, wherein the measuring device of the machine is being used at the moment shown;

FIG. 3D shows a top view of the tool and a second workpiece, wherein the workpiece is machined using the second tool at the moment shown.

DETAILED DESCRIPTION OF EMBODIMENTS OF THE INVENTION

Terms are used in conjunction with the present invention, which are also used in relevant publications and patents. However, it is to be noted that the use of these terms is only to serve for better comprehension. The inventive concept and the scope of protection of the patent claims are not to be restricted in the interpretation thereof by the specific selection of the terms. The invention may be readily transferred to other term systems and/or technical fields. The terms are to be applied accordingly in other technical fields.

Figure 1:
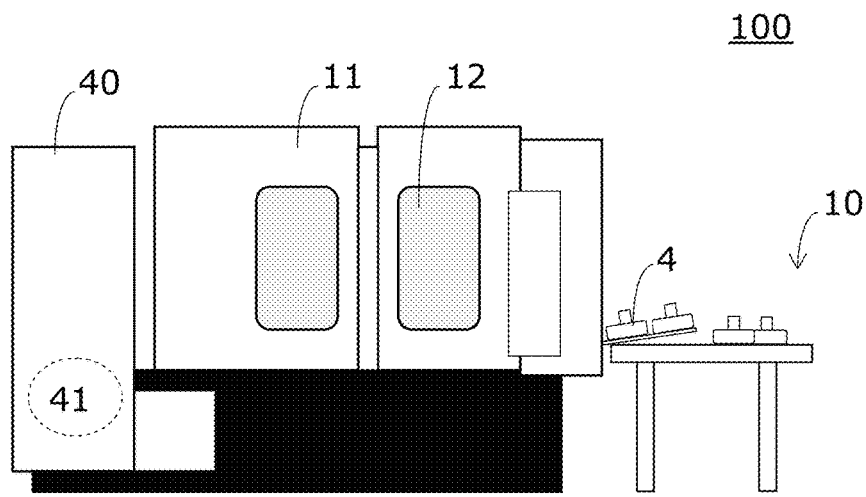
FIG. 1 shows a schematic front view of a gear cutting machine, in which the method according to the invention can be used.

FIG. 1 shows a schematic view of a (gearwheel) machine 100 equipped according to the invention. The machine 100 is a gear cutting machine. The actual machining space—in which gearwheels (corresponding blanks 4 are shown on the right in the region of a workpiece supply 10) are machined—is located behind the panel 11, which can be provided with viewing windows 12, for example. A (CNC) controller 41 can be housed in the housing of the same machine 100 or in a separate housing 40.

The machine 100 is especially designed for the cutting machining (for example, grinding or milling) of the tooth flanks of gearwheels. Since this primarily relates to the mass production of gearwheels here, reference is made hereafter to a first workpiece 1, a second workpiece 2, and a third workpiece 3. Numerals are used here to specify a chronological sequence. The first workpiece 1 is machined in chronological sequence before the second and each further workpiece. The second workpiece 2 is machined after the workpiece 1 and before the workpiece 3. It is important to note in conjunction with the present invention that the second workpiece 2 does not have to be machined directly after the first workpiece 1 and the third workpiece 3 does not have to be machined directly after the second workpiece 2.

Figure 2A:
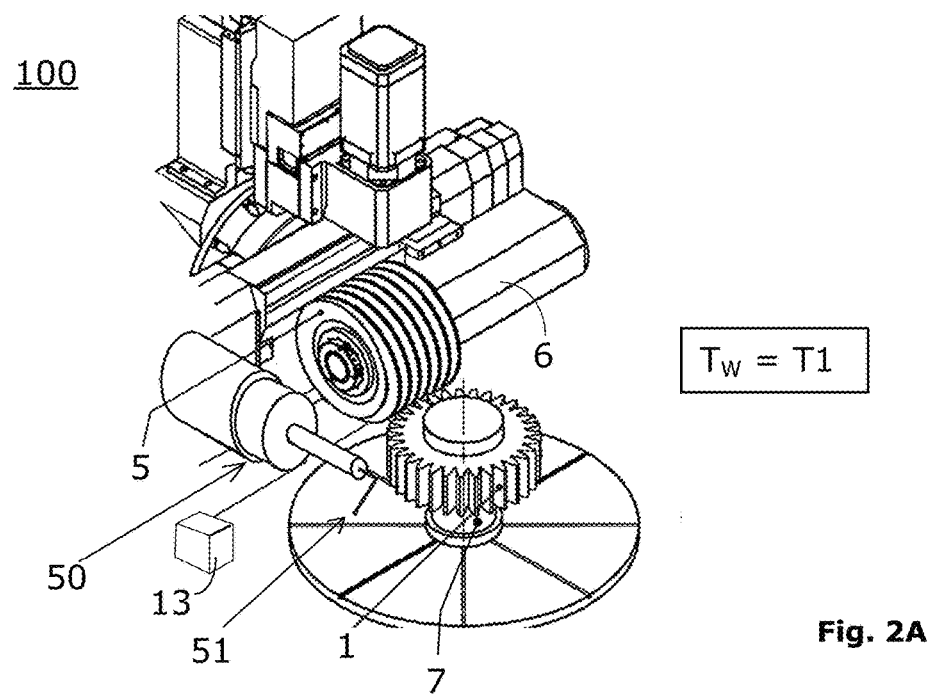
FIG. 2A shows a perspective view of a part of an exemplary gear cutting machine having measuring device, in which the method according to the invention can be used, wherein a workpiece is being machined at the moment shown.
Figure 2B:
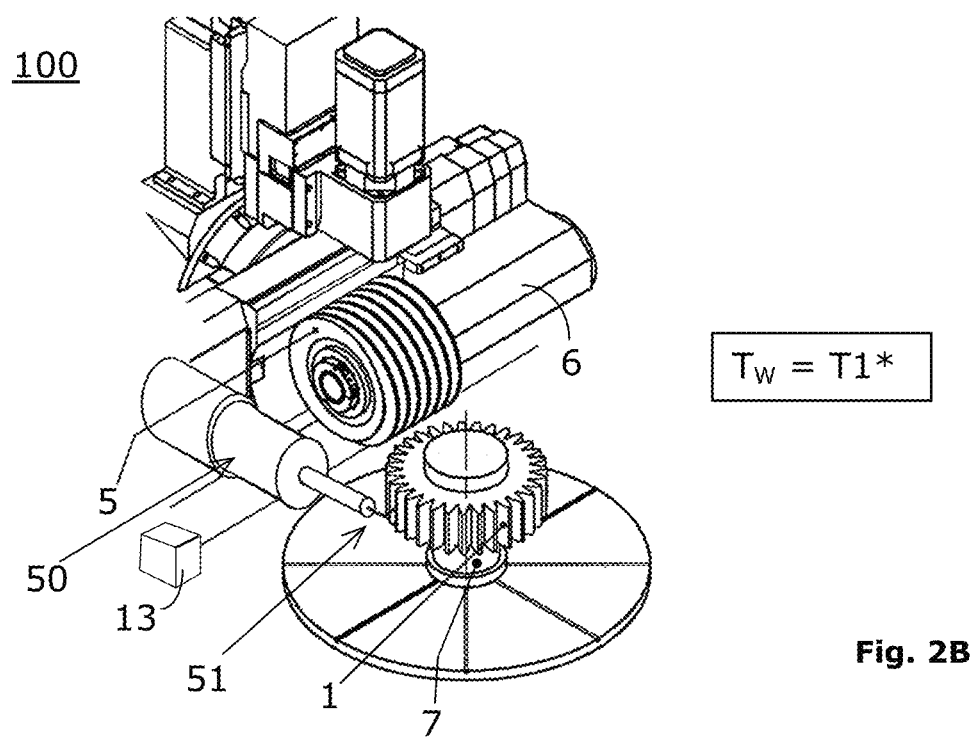
FIG. 2B shows a perspective view of a part of the gear cutting machine of FIG. 2A, wherein the measuring device of the machine is being used at the moment shown (this relates here to a structure having a measuring probe, which is referenced before the measurement)

Exemplary details of the operating range of a machine 100 are shown in FIGS. 2A and 2B. The example shown is a machine 100 which comprises a worm grinding wheel as a tool 5 and is designed for the roller grinding of spur gears. The invention can also be used in other machines (for example, in a machine for grinding bevel gears). The rotary drive (spindle drive) of the tool 5 is identified by the reference sign 6. The cutting machining of the workpiece 1 using the tool 5 is shown in FIG. 2A. At the moment shown, the tool 5 is operatively connected to the workpiece 1.

It can be inferred from FIGS. 2A and 2B that the machine 100 has clamping means for clamping a workpiece to be machined (for example, a blank 4). The workpiece 1 is clamped on the workpiece spindle 7 in FIGS. 2A and 2B. The clamping means cannot be seen directly. In addition, the machine 100 comprises a tool clamping means for chucking a gear cutting tool 5 (for example, a grinding or milling tool) for the cutting machining of the tooth flanks of the workpiece 1. The tool clamping means cannot be seen in the figures, since they are seated in the region between the tool 5 and the rotary drive 6.

In addition, the machine 100 comprises a measuring device 50, as shown in very schematic form in FIGS. 2A and 2B. This measuring device 50 is a component of the machine 100 in all embodiments, i.e., the measuring device 50 is fastened on the machine 100. The measuring device 50 according to FIGS. 2A and 2B is designed so that it can be referenced. The referencing enables the most accurate possible measuring on the workpiece 1 in spite of temperature-related changes, which can also affect the measuring device 50.

The measuring device 50 is preferably designed in all embodiments so that it can be moved away, so as not to be damaged during the machining of the workpiece 1 using the tool 5. It is indicated by way of example in FIG. 2A and FIG. 2B that the measuring device 50 can have a telescoping structure. In FIG. 2A, the telescoping structure is retracted and the actual sensor 51 is folded or pivoted away. In FIG. 2B, the telescoping structure is extended and the sensor 51 has been folded or pivoted into a tooth gap.

In all embodiments, the machine 100 preferably comprises a reference point or a reference surface 13, which is indicated in FIGS. 2A and 2B. This reference point or this reference surface 13 is designed as temperature-stable or temperature-neutral, so that a reference is available within the machine 100, which is not subject to temperature-related displacements or changes. The acquisition of a reference variable from a reference point or a reference surface 13 is referred to here as referencing.

The measuring device 50 is preferably designed as temperature-neutral in all embodiments, so that corrupted measurement results are not obtained due to temperature changes.

In all embodiments, the measuring device 50 is preferably positioned as close as possible to the workpiece spindle 7 and not in the region of the tool 5 (temperature neutral with respect to its location relative to the workpiece 1) or the measuring device 50 is to be referenced before the measurement (see FIGS. 2A and 2B). Otherwise, measuring would occur incorrectly during a measurement after a pause (cooling).

In all embodiments, the measuring device 50 preferably comprises a temperature-neutral and rigid construction, so that it also remains stable under various temperature influences. The essential elements of the measuring device 50 can be constructed, for example, from a combination of carbon fiber composite materials and ceramic (for a minimum weight and high for a high level of rigidity). The measuring standards which are used can be manufactured, for example, from a temperature-neutral ceramic. Additionally or alternatively, the measuring device 50 can be embodied as temperature-compensated (for example, having an active dynamic temperature compensation).

In machines 100 which are equipped with a reference point or a reference surface 13, the measuring device 50 can get a spatial reference during referencing, for example, by the sensor 51 scanning the reference point or the reference surface 13. The coordinate values of the reference point or the reference surface 13 can then be used during subsequent computations as a computer reference, for example.

Because of the cutting machining, a workpiece temperature $T_W$ results, which reaches the value T1 indicated in FIG. 2A. After the machining is completed, a relative movement is executed in the machine 100 to separate the tool 5 from the workpiece 1. The corresponding state is shown in FIG. 2B. The workpiece 1 slowly cools down. A workpiece temperature $T_W$ results, which assumes the value T1\* indicated in FIG. 2B. The following statement applies in this case: T1>T1*.

The measuring device 50 is now used, as indicated in FIG. 2B. At least one characteristic workpiece variable W.1 of the workpiece 1 is ascertained by means of the measuring device 50. This is performed according to the invention as immediately as possible after the machining of the workpiece 1. This means the workpiece 1 is still hot upon the ascertainment of the characteristic workpiece variable W.1.

Several exemplary numeric values from practice are provided hereafter. The steady-state temperature $T_{VH}$ of a machine 100 is dependent, inter alia, on the ambient temperature. Temperature differences between a machine just put into operation and an operationally-hot machine of 20° to greater than 30° result during milling, for example. The temperatures of the workpieces 1 can increase to up to 60° C. after milling machining, i.e., they experience a temperature increase by approximately 40° C. due to the machining. The temperature changes on a grinding machine are significantly below these values.

Since blanks 4 or workpieces 1 are machined in the machine 100 which are turned parts, for example, the circumferential surface thereof (cylinder lateral surface in a spur gear or truncated cone surface in a bevel gear) are not are not accurately dimensioned. The scanning of the circumferential surface using the measuring device 50 therefore does not result in usable workpiece variables, even if the measuring device 50 operates accurately in the event of changing temperatures or measures in a temperature-compensated manner. According to the invention, the characteristic workpiece variable W.1 is therefore preferably determined in all embodiments on surfaces or points which were just machined in the machine 100. In the example of FIG. 2B, the sensor 51 penetrates into a tooth gap, to scan the gap width therein, for example. The gap width can be scanned, for example, on the pitch circle NK of the workpiece 1 and supplied for further processing as the characteristic workpiece variable W.1.

Further aspects of the invention will be described hereafter on the basis of the method steps which are executed during the operation of the gear cutting machine 100. The machine 100 according to the invention is distinguished in that it is designed for carrying out the method described in greater detail hereafter. A suitable machine 100 preferably also comprises, in addition to the required axes, clamping means, and drives, the mentioned measuring device 50. Furthermore, software is used, which is installed in the machine 100 or in a system connectable to the machine 100.

The method preferably comprises the following steps:

The machining of a first workpiece 1 is carried out in the machine 100 (see FIG. 2A), wherein the first workpiece 1 heats up because of the machining. The workpiece 1 reaches a temperature of $T_W$=T1.

At least one characteristic workpiece variable W.1 is then determined on the first workpiece 1 in the heated state (here at $T_W$=T1*), wherein the sensor 51 of the machine 100 is used for the determination. A corresponding snapshot is shown in FIG. 2B.

A so-called compensation determination is then carried out. This is performed on the basis of the at least one characteristic workpiece variable W.1 of the first workpiece 1 and on the basis of at least one characteristic workpiece variable W.R of a reference workpiece R. In the above-mentioned example, for example, the gap width of the first workpiece 1 at $T_W$=T1* is compared to the gap width of a reference workpiece R. It is to be noted in this case that the characteristic workpiece variable W.R of the reference workpiece R has also been determined in the hot state. The characteristic workpiece variable W.R of the reference workpiece R was preferably also determined at a temperature which approximately corresponds to the temperature T1*. In all embodiments, the characteristic workpiece variable W.R of the reference workpiece R is preferably determined in the machine 100 after reaching the steady-state temperature $T_{VH}$. This means this characteristic workpiece variable W.R was determined after the machine 100 was operated for a long time and was therefore in the thermally stabilized state. At least one compensation value is determined in the scope of the compensation determination. In the mentioned example, for example, the following situation is conceivable. Because of the fact that the temperature of the machine 100 was still below the steady-state temperature $T_{VH}$ during the machining of the first workpiece 1, the workpiece 1 has somewhat different dimensions than the reference workpiece R. In the described example, for example, the gap width of the reference workpiece R is somewhat greater than the gap width of the first workpiece 1. The difference of the two gap widths (i.e., the difference of the two characteristic workpiece variables W.R and W.1) is computed in the scope of the compensation determination. A compensation value can be determined therefrom for the machining of the next workpiece 2 in the machine 100. In a completing method, in which the profile of the tool 5 specifies the shape of the tooth gaps on the workpiece, the compensation value can specify that during the machining of the next workpiece 2, the tool 5 has to plunge somewhat deeper into the tooth gap to be machined.

At least one machine setting is now adapted on the basis of the compensation value. In the mentioned example, for example, the plunging depth is changed in consideration of the compensation value.

The machining, for example, of the second workpiece n=2 in the machine 100 is then performed. The gap width which was previously determined to be excessively small on the workpiece 1 is thus compensated for on the workpiece 2.

This example is clarified further on the basis of FIGS. 3A to 3D. A spur gear is shown as the first workpiece 1 in these Figures. A grinding disk is used as the tool 5 in the scope of a completing method. The profile of the tool 5 determines the shape of the tooth gaps on the workpiece 1.

A fixed coordinate axis x is shown on the left in each of FIGS. 3A to 3D. This coordinate axis x is used solely to illustrate the relationships.

The rotational axis of the tool RW is in the plane of the drawing in FIGS. 3A to 3D. It can be seen in FIG. 3A that the tool 5 is plunged with its rotational axis RW up to a position x1 into the tooth gap of the workpiece 1. The rotational axis RA of the workpiece 1 is perpendicular to the plane of the drawing and is located fixed here at the position x=x0.

After the workpiece 1 has been machined, workpiece 1 and tool 5 are separated in relation to one another. This step is shown in FIG. 3B. In the example shown, the workpiece 1 remains in the previous position x=x0 and the rotational axis RW of the tool 5 is moved back together with the tool 5 (from the position x1 to the position x2 here). The determination of the characteristic workpiece variable W.1 of the first workpiece 1 is now performed. For this purpose, a sensor 51 is plunged into a tooth gap of the workpiece 1 and moved toward the left and toward the right tooth flank of this tooth gap. This can be performed, for example, on the pitch circle NK. The compensation determination is now carried out (preferably by computer by means of software) to determine whether and to what extent the gap width of the first workpiece 1 deviates from a gap width of a reference workpiece R used as a reference variable W.R.

In the described example, for example, the gap width of the reference workpiece R is somewhat less than the gap width of the first workpiece 1. The difference of the two gap widths (i.e., the difference of the two characteristic workpiece variables W.R and W.1) is computed in the scope of the compensation determination.

In a subsequent method step, as shown in FIG. 3D, a further workpiece is machined. The example shown relates to the second workpiece 2. Since the measured gap width on the hot workpiece 1 was greater than on the hot reference workpiece R, in the step of FIG. 3D, the tool 5 does not have to plunge as far into the material of the workpiece 2 as was the case in FIG. 3A. As a compensation value, for example, a value x1* can be determined. The difference (parallel to the x axis) between the value x1 and the value x1* results from a transformation computation. This means the value x1* is determined so that (if the temperature of the machine 100 and the workpiece 2 are the same as in FIG. 3A), in spite of temperature-related deviations, the tool 5 plunges in somewhat less. A workpiece 2 is now manufactured in FIG. 3D, the values of which have been compensated for in the manner of temperature faults. In FIG. 3D: $|x0-x1^*|>|x0-x1|$.

According to the invention, the determination of characteristic workpiece variables can be repeated from time to time while the machine 100 heats up further. Thus, for example, the third workpiece 3 and the fourth to tenth workpieces can be manufactured with the same compensation value as described in conjunction with FIG. 3D. The tenth workpiece can be measured again (as shown in FIG. 3C) in the hot state (like the first workpiece 1 previously). A compensation value can then be determined for the eleventh workpiece. The eleventh workpiece is then machined with application of this compensation value. It can thus be ensured until reaching the steady-state temperature $T_{VH}$ that the workpieces processed in the intervening period of time are relatively dimensionally accurate.

To preclude faults after an interruption (for example, because an incorrect tool was chucked), before carrying out the machining of the first workpiece 1, the following steps can be carried out on another workpiece 0:
- carrying out the machining of this other workpiece 0 in the machine 100, wherein this other workpiece 0 heats up during the machining,
- determining one or more characteristic variables of this other workpiece 0 in the cooled state, to establish whether this other workpiece 0 corresponds to target values,
- if this other workpiece 0 corresponds to the target values, it is possible to begin with the machining of the first workpiece 1, as described. If this other workpiece 0 should not correspond to the target values, a check thus has to be carried out (for example, by the operator of the machine 100).

This can be carried out in a separate measuring machine, which is connectable via a closed loop to the machine 100.

What is claimed is:

1. A method for operating a gear cutting machine, comprising the following steps:
   (a) machining a first workpiece in the gear cutting machine, wherein the temperature of the first workpiece increases as a result of the machining,
   (b) determining at least one characteristic workpiece variable of the first workpiece at the increased temperature, wherein a measuring device on the gear cutting machine is used for determining the at least one characteristic workpiece variable,
   (c) determining at least one compensation value by comparing the at least one characteristic workpiece variable of the first workpiece and at least one characteristic workpiece variable of a reference workpiece, wherein the characteristic workpiece variable of the reference workpiece was determined in the gear cutting machine after reaching a steady-state temperature machined while the gear cutting machine was operating at a steady state temperature defined by the temperature of the gear cutting machine after a period of continuous operation, (d) adjusting at least one gear cutting machine setting based upon the at least one compensation value, and (e) machining a workpiece in the gear cutting machine after adjusting the at least one gear cutting machine setting.

2. The method according to claim 1 wherein the machining of the first workpiece and the determination of the at least one characteristic workpiece variable are performed when the gear cutting machine is operating at less than a steady state temperature.

3. The method according to claim 1, wherein the determination of the at least one characteristic workpiece variable of the first workpiece and the reference workpiece is performed by a measuring probe of a measuring device, wherein the measuring device is part of the gear cutting machine and wherein the corresponding workpiece is not re-chucked during the determination of the at least one characteristic workpiece variable.

4. The method according to claim 2, wherein the gear cutting machine is operating at less than a steady state temperature due to at least one of stoppage of the gear cutting machine because of a shutdown, stoppage of the gear cutting machine because of maintenance or repair, or stoppage of the gear cutting machine because of refitting.

5. The method according to claim 4, wherein the stoppage of the gear cutting machine is for a period of at least 15 minutes.

6. The method according to claim 4, wherein the stoppage of the gear cutting machine results in a reduction of the temperature measured in the gear cutting machine of more than 10% of the steady-state temperature in the gear cutting machine following a period of continuous operation.

7. The method according to claim 1, further comprising the steps of:

prior to machining of the first workpiece, machining a test workpiece in the gear cutting machine wherein the test workpiece heats up during the machining, and allowing the test workpiece to cool to ambient temperature and determining one or more characteristic variables of test workpiece in the cooled state, to determine whether the one or more characteristic variables correspond to target values.

* * * * *